United States Patent [19]
Jakobsson

[11] Patent Number: 6,049,613
[45] Date of Patent: Apr. 11, 2000

[54] METHOD AND APPARATUS FOR ENCRYPTING, DECRYPTING, AND PROVIDING PRIVACY FOR DATA VALUES

[76] Inventor: Markus Jakobsson, 161 Newark St. No. 4A, Hoboken, N.J. 07030

[21] Appl. No.: 09/005,920

[22] Filed: Jan. 13, 1998

Related U.S. Application Data

[60] Provisional application No. 60/035,587, Jan. 17, 1997.
[51] Int. Cl.[7] .............................. H04L 9/12; H04K 1/10
[52] U.S. Cl. ................................ 380/47; 380/28; 708/174
[58] Field of Search ................................ 380/28, 21, 44, 380/47, 279; 708/174, 210; 712/7; 713/155

[56] References Cited

U.S. PATENT DOCUMENTS

| | | | |
|---|---|---|---|
| 5,682,428 | 10/1997 | Johnson | 380/23 |
| 5,892,775 | 4/1999 | Jayant et al. | 371/2.1 |

OTHER PUBLICATIONS

Taher ElGamal, "A Public Key Cryptosystem and a Signature Scheme Based on Discreet Logarithms", 1–9, Hewlett Packard Labs, California.
Choonsik Park, et al, "Efficient Anonymous Channel and All/Nothing Election Scheme", 1–12., Tokyo Institute of Technology.
Torben Pryds Pedersen, "Distributed Provers with Applications to Undeniable Signatures", 1–22, Aarhus University, Denmark.
Heys, H.M. et al., "Avalanche Characteristics of Substitution–Permutation Encryption Networks," IEEE Transactions on Computers, vol. 44, No. 9, Sep. 1995, pp. 1131–1139.
*Information and Communications Security*, Yongfei Han, Tatsuaki Okamoto, Sihan Qing (Eds.), First International Conference, ICIS '97, Beijing, China, Nov. 11–14, 1997 Proceedings, Fault Tolerant Anonymous Channel, pp. 440–444 (see references cited therein also).
C. Gulcu, G. Tsudik, "Mixing email with babel," ISOC Symposium on Network and Distributed System Security, 1996.

*Primary Examiner*—Tod R. Swann
*Assistant Examiner*—Justin T. Darrow
*Attorney, Agent, or Firm*—Walter J Tencza, Jr.

[57] ABSTRACT

A mix network with superior privacy and robustness is provided. An apparatus comprising a duplicator and first and second operation modules is disclosed. The first and second operation modules are each comprised of first and second processors. Each processor is comprised of a partial operation device. The duplicator preferably duplicates a vector of encrypted inputs, and provides first and second substantially similar duplicated vectors, to the first and second operation modules, respectively. The partial operation device of the first processor of the first operation module partially operates on the first duplicated vector, then supplies the result to the partial operation device of the second processor of the first operation module which partially operates on it to provide a fully operated on first duplicated vector. Likewise, the partial operation device of the first processor of the second operation module partially operates on the second duplicated vector, then supplies the result to the partial operation device of the second processor of the second operation module which partially operates on the partially operates on the second duplicated vector to provide a fully operated on first duplicated vector. A means for comparing compares the fully operated on first duplicated vector with the fully operated on second duplicated vector.

17 Claims, 7 Drawing Sheets

FIG. 1

Prior Art

METHOD AND APPARATUS FOR ENCRYPTING, DECRYPTING, AND PROVIDING PRIVACY FOR DATA VALUES

BENEFIT OF PROVISIONAL APPLICATION FILING DATE CLAIMED

The present regular patent application is based at least in part on a provisional patent application filed on Jan. 17, 1997 by the applicant, Markus Jakobsson, title "Robust batch blinding", provisional application Ser. No. 60/035,587.

FIELD OF THE INVENTION

This invention relates to improved methods and apparatus for mix networks and more particularly to networks which efficiently provide privacy and robustness.

BACKGROUND OF THE INVENTION

The present invention deals with the area of encryption, decryption, re-encryption, permutation, and blinding of messages. Encryption takes a cleartext message and produces an encrypted message. Decryption takes an encrypted message and produces its corresponding cleartext message. Re-encryption takes an encrypted message and produces another encryption of the same message. Blinding may include the operations of encryption or reencryption and permutation which is later defined.

It is known in the prior art to take a message and turn it into an encrypted message using a first user's public key. The first user upon receiving the encrypted message can then decrypt it, to reveal the original message, using the first user's secret key. The first user's public key is as the name implies, available to the public so that others can send messages to the first user. However, the first user's secret key is not available. The public key is associated with a one-way function, i.e. once the message is encrypted it cannot be decrypted without the secret key even though the public key and the encryption algorithms are known.

El Gamal encryption is known in the art. This encryption takes a message m as an input; chooses a random value "r", and produces an outputs $a=m*y^r$ modulo p; $b=g^r$ modulo p. For El Gamal decryption $c=a/b^x$ modulo p; and the output c is the message m. For El Gamal re-encryption the input is (a,b), a random value r2 is chosen, $a2=a*y^{r2}$ modulo p, $b2=b*g^{r2}$ modulo p are calculated, and the output is (a2, b2). (a2, b2) and (a, b) decrypt to the same message "m" when all encryption is removed. In the above $y=g^x$ modulo p is the public key and x is the secret key. The variables g, x, and p and other system parameters are picked according to methods known to a person skilled in the art.

The present invention also refers to the area of permutation. An example of permutation is as follows. Three votes are received in the following order: "yes", "yes", "no". The votes are randomly permuted, that is reordered in some random fashion to produce for example the following order: "no", "yes", "yes". The votes are the same, i.e. two "yes"es and one "no", however by permuting them, which particular voter voted what cannot be determined. This is only true (that you cannot tell who voted what) as long as you don't know the permutation used. If the votes were first encrypted, then both permuted and re-encrypted then it is not possible to determine what input item produced what output item.

In mix networks, which are generally known, the concepts of encryption, decryption, and permutation are used together. A mix network takes a vector of values as input, and outputs a permuted or reordered list of function evaluations (typically decryptions) of the input items, without revealing the relationship between the input and output values. Mix networks are particularly useful for elections.

Prior art mix networks do not provide adequate privacy or robustness in an efficient manner. The term "Privacy" is used herein to mean providing for example a voter with privacy from others and from the entity or entities providing the mix, from discovering how he voted. The term "Robustness" is used herein to mean providing the ability to make sure that the final results were correctly calculated, even if some entities actively cheated. Efficiency is provided by utilizing a low amount of communication, storage, and computation.

Figure 1:
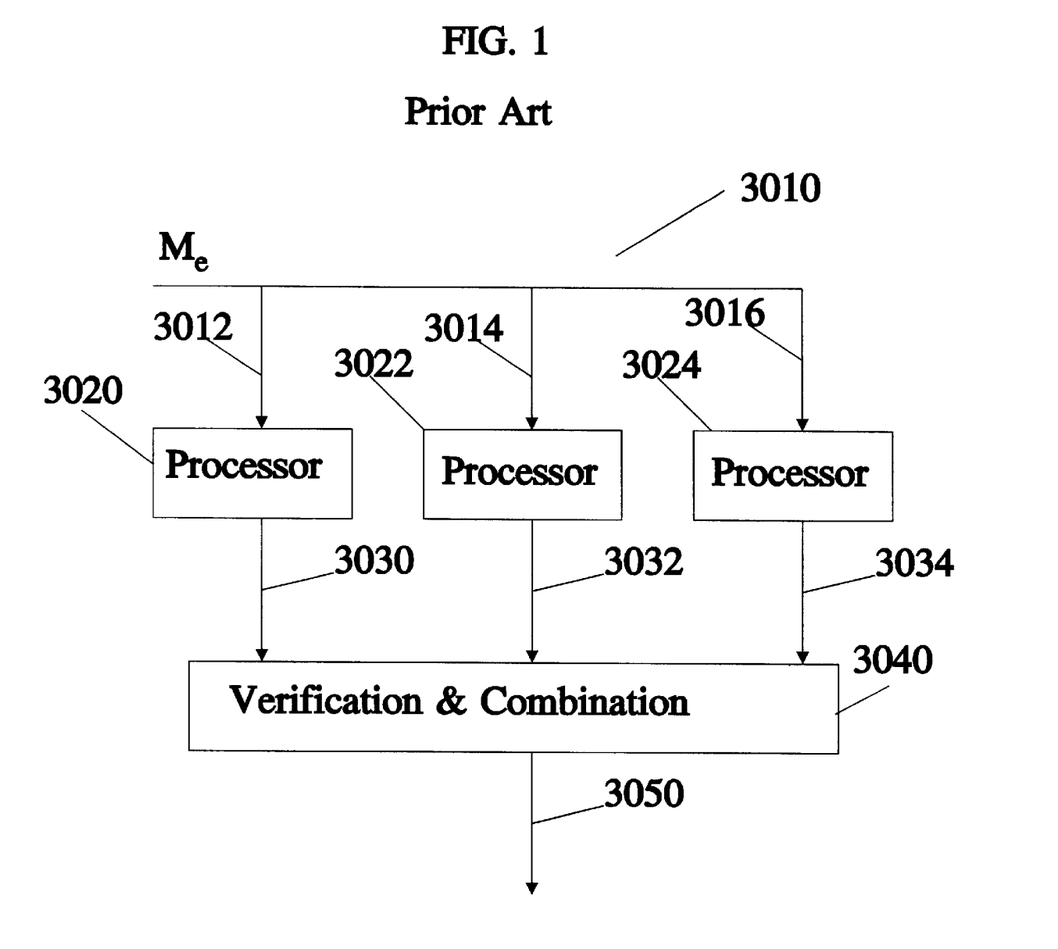
FIG. 1 shows a block diagram of a first prior art network.

There are two types of schemes already known as follows:

The first type, disclosed by Pedersen, are schemes with two or more processors where an input is processed by secret keys held by the processors, and some fixed number (set by the protocol designer) of processors have to cooperate. The scheme can be robust. It only decrypts one item at a time. If it decrypts more than that, the relationship between input and output messages is known, and therefore, there is no privacy. This first type is shown in FIG. 1.

Figure 2:
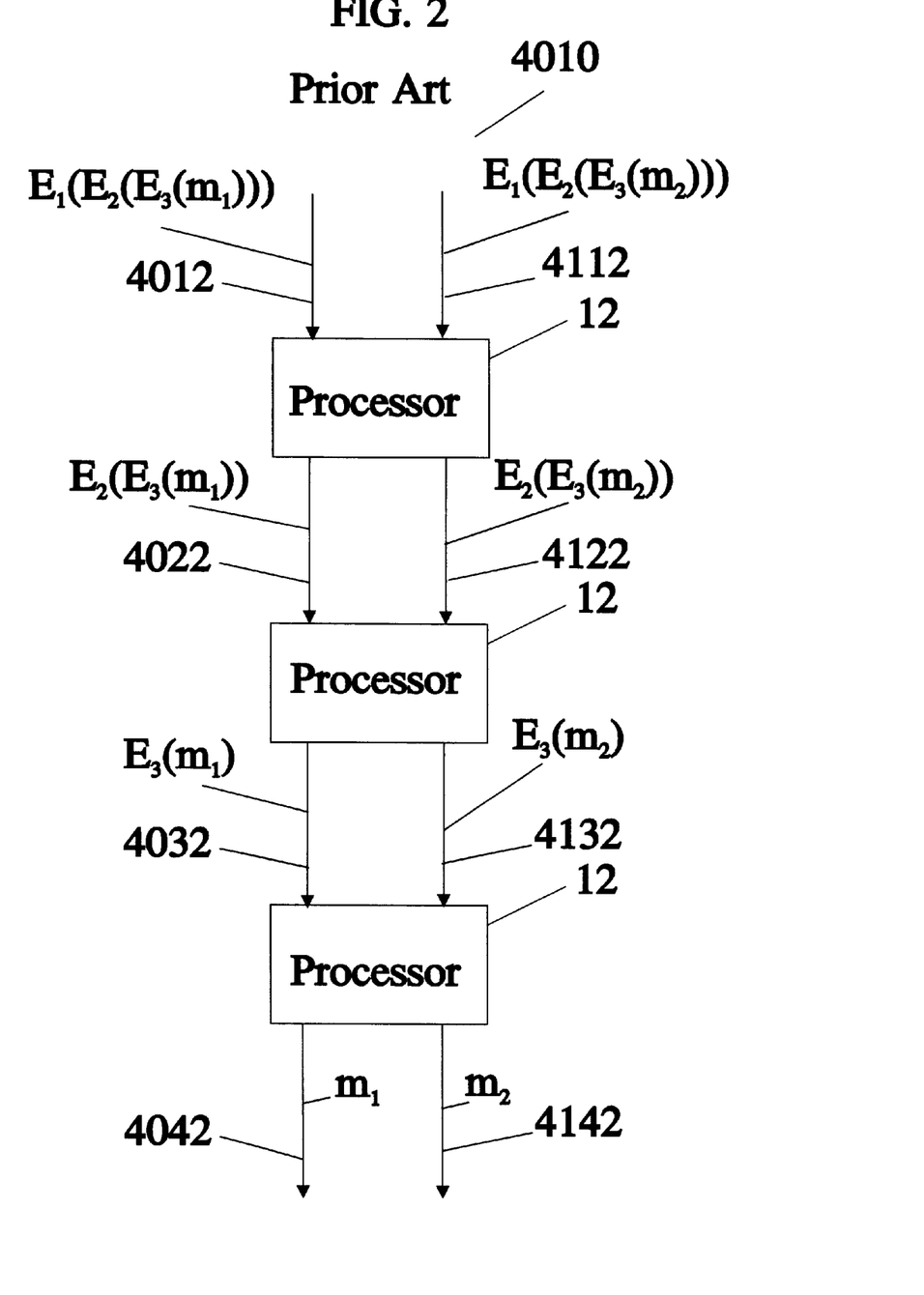
FIG. 2 shows a block diagram of a second prior art network.

The second type are schemes as above, but where there is privacy, obtained by using permutation, but there is no robustness. The second type is shown in FIG. 2, by David Chaum, Syverson, et al. and Gulcu et al., as known by those skilled in the art.

Neither of these schemes is well suited for elections, as either privacy or robustness is given up. Likewise, there are many other applications, such as web commerce schemes, where both privacy and robustness is required, and a solution based on either of the above two approaches.

In a more recent scheme, Ogata, Kurosawa, Sako, and Takatani disclose a mix network for decryption that has both privacy and robustness, but which is not efficient, as disclosed in "Fault tolerant anonymous channel," W. Ogata, K. Kurosawa, K. Sako, and K. Takatani, Proceedings of Information and Communications Security '97, pages 440–444. Their method is based on the well-known method of cut-and-choose, as can be appreciated by a person skilled in the art. In their scheme, each processor (or server) permutes and re-encrypts each message, and then permutes and re-encrypts again such permuted and re-encrypted message. Then this server is required to "open up" one of the two transactions. That means that it will reveal exactly how it performed one of the consecutive permutations and one of the consecutive re-encryptions. Which one is determined by the other servers. This process is repeated serveral times. If it is repeated k times then the probability that a processor will cheat and not be detected is $\frac{1}{2}^{}k$ ($\frac{1}{2}k$). For example, for k=3, the chances are $\frac{1}{2}^{}3=\frac{1}{8}$. To gain a high degree of robustness, a large number of repetitions is required. Each processor has to engage in the above protocol. Since cut-and-choose is not efficient, neither is the resulting mix network for decryption.

SUMMARY OF THE INVENTION

The present invention in some embodiments provides a mix network with superior privacy, robustness, and efficiency. In one embodiment an apparatus comprising a duplicator and first and second operation modules or sections are provided. The operation modules are preferably decryption modules although they can in some embodiments be encryption, re-encryption, permutation, and/or blinding modules and/or other operations known to a person skilled in the art. The first and second operation modules are each comprised of first and second processors. Each processor is comprised of a partial operation device. The partial operation device is preferably a partial decryption device. Each processor is preferably a stand alone computer such as a stand alone personal computer.

The duplicator preferably duplicates a vector of encrypted inputs, and provides first and second substantially similar duplicated vectors, to the first and second operation modules, respectively. The first and second substantially similar duplicated vectors are preferably identical. The vector of inputs could in some embodiments be a non-encrypted vector of inputs. The partial operation device of the first processor of the first operation module partially operates on the first duplicated vector, then supplies the result to the partial operation device of the second processor of the first operation module which partially operates on it to provide a fully operated on first duplicated vector. Preferably the partial operation is one of partial decryption.

Likewise, the partial operation device of the first processor of the second operation module partially operates on the second duplicated vector, then supplies the result to the partial operation device of the second processor of the second operation module which partially operates on the partially operated on second duplicated vector to provide a fully operated on first duplicated vector. Again the operation modules are preferably decryption modules and the partial operation devices are preferably partial decryption devices.

The apparatus is preferably further comprised of a means for comparing which compares the fully operated on first duplicated vector with the fully operated on second duplicated vector. Preferably fully operated on in this situation means fully decrypted. The means comparing is preferably comprised of first and second sorting sections. Preferably the fully operated on first and second duplicated vectors are both sorted by sorting sections and compared. If the sorted results are identical, then we can say that no processor cheated, no processor made a mistake, and no error was otherwise introduced.

A plurality of further operation modules can be provided. The first, second and the plurality of further operation modules may have any number of processors therein.

Preferably the duplicator is preceeded by a first blinding section, which preferably permutes and re-encrypts a pre-first encrypted vector of inputs to provide a first vector of inputs. (It could also be thought of as encrypting a first encrypted vector to provide a second encrypted vector). In some embodiments the first blinding section may not permute. In addition, between the duplicator and the operation layer, a second blinding layer is preferably provided which also permutes and re-encryprts. The operation layer is preferably followed by a second unblinding layer, and a sorting layer. The second unblinding layer removes the encryption introduced by the second blinding layer. The sorting layer puts inputs in a particular order for comparison, i.e. so that the relative impact of permutation in the second blinding layer is removed. The sorting layer may be part of a means for comparing which would also be comprised of a comparison section. The comparison section would be followed by a first unblinding section which removes the permutation and encryption introduced by the first blinding section. The first unblinding section would only perform first unblinding operations if the result from the comparison section shows that no one has cheated, i.e. that the fully operated on duplicated vectors (with or without other blinding operations) are substantially the same, preferably identical.

DETAILED DESCRIPTION OF THE DRAWINGS

Prior Art

FIG. 1 shows a block diagram of a first prior art network 3010. The first prior art network 3010 is in accordance with a method suggested by Pedersen as known by those skilled in the art. The first prior art network 3010 includes processors 3020, 3022, and 3024 and verification and combination section 3040. The processors 3020, 3022, and 3024 include inputs 3012, 3014, and 3016 and outputs 3030, 3032, and 3034 respectively. The verification & combination section 3040 has inputs 3030, 3032, and 3034, and and output 3050. In the first prior art network 3010 an encrypted message E(m) is input to the three processors 3020, 3022, and 3024. The processors 3020, 3022, and 3024 use first, second and third secret keys, respectively to partially decrypt the encrypted message E(m). First, second, and third partial decryptions appear on the outputs 3030, 3032, and 3034 respectively. Also appearing on each output 3030, 3032, and 3034 may be a proof of how the encrypted message E(m) was partially decrypted by each processor. The partial decryptions and their corresponding proofs are input to the verification & combination section 3040 which verifies the proofs and combines the first, second, and third partial decryptions to form a fully decrypted message "m" at the output 3050. There can be any number of processors in this scheme and three are only shown for exemplary purposes. Also, many different public key functions can be performed, and not only decryption.

FIG. 2 shows a block diagram of a second prior art network 4010. The second prior art network 4010 is in accordance with a method by Chaum as known by those skilled in the art. David Chaum introduced mix metworks in 1981. The prior art network 4010 includes processors 4020, 4030, and 4040. Processor 4020 receives encrypted messages $E_1(E_2(E_3(m_1)))$ and $E_1(E_2(E_3(m_2)))$ on its inputs 4012 and 4112 respectively. The encrypted messages $m_1$ and $m_2$ were actually encrypted three times, first by encryption $E_3$, then $E_2$, and then $E_1$. The processor 4020 does a first decryption to remove the encryption $E_1$, and performs a random permutation, and outputs a permutation of the quantities $E_2(E_3(m_1))$ and $E_2(E_3(m_2))$ on its outputs 4022 and 4122, respectively. The processor 4030 does a second decryption to remove the encryption $E_2$, and performs a random permutation and outputs a permutation of the quantities $E_3(m_1)$ and $E_3(m_2)$ on its outputs 4032 and 4132, respectively. The processor 4040 does a third decryption to remove the encryption $E_3$, and performs a random permutation, to produce a permutation of the fully decrypted messages $m_1$ and $m_2$, on the outputs 4042 and 4142 respectively. In the figure, the operation is shown without permutation for simplicity. Chaum's mix network 4010 is not robust.

Applicant's Invention

Figure 3:
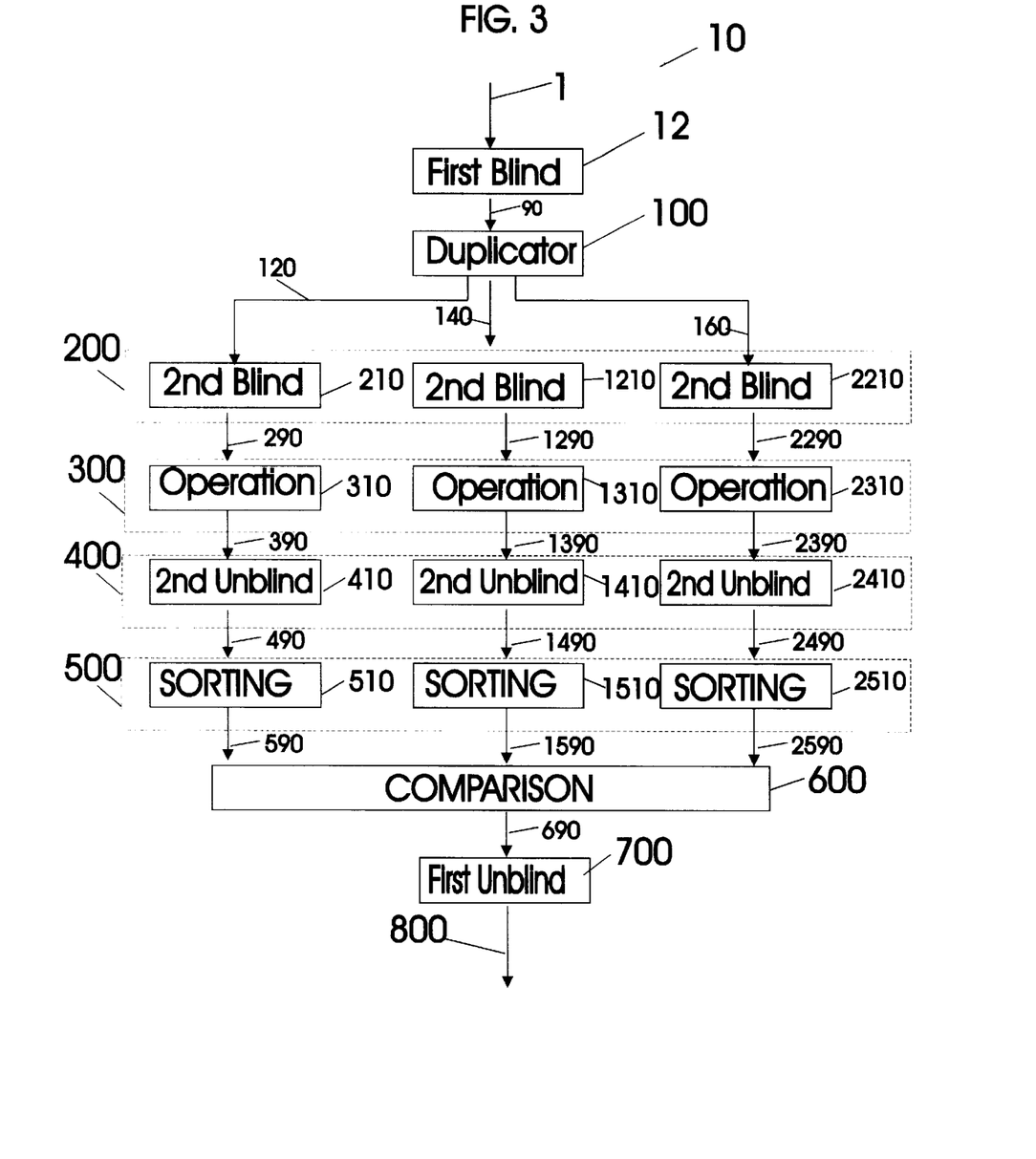
FIG. 3 shows a block diagram of a mix network in accordance with the present invention.

FIG. 3 shows a block diagram of a mix network 10 in accordance with an embodiment of the present invention. The mix network 10 can be thought of as having three branches corresponding to output vectors 120, 140, and 160. Each branch performs basically the same operations (with variations in permutation and in encryption factors). If each branch is acting properly the results produced at output vectors 590, 1590, and 2590 should be substantially the same, preferably identical. Each branch would then have a fully decrypted and fully operated on permuted list of messages (with the exception of the first unblinding, which is the same for all three branches, performed in 700). One of the differences between the prior art FIG. 1 and the applicant's invention FIG. 3 is that each branch corresponding to inputs 3012, 3014, and 3016 has only a part of a decrypted message and these have to be combined. In addition, FIG. 1 has no privacy, there is only one message, and there is no permutation. FIG. 1 has only robustness, and no privacy whereas the disclosed invention has both. The FIG. 2 prior art obviously differs from FIG. 3 in that the encrypted message $E_1(E_2(E_3(m_1)))$ is not sent to multiple branches. In addition FIG. 2 does not have robustness, only privacy whereas the disclosed invention has both.

Mix network 10 of an embodiment of the present invention includes first blinding section 12, duplication section 100, second blinding layer 200, operation layer 300, second unblinding layer 400, sorting layer 500, comparing section 600, and first unblinding section 700.

Second blinding layer 200 is comprised of blinding sections 210, 1210, and 2210. There can be any number of blinding sections similar to blinding sections 210, 1210, and 2210. Operation layer 300 is comprised of operation sections or modules, 310, 1310, and 2310. Of course there can be any number of such operation modules or any number of the other sections or modules and three are used here for illustration. Second unblinding layer 400 is comprised of unblinding sections or modules 410, 1410, and 2410. Sorting layer 500 is comprised of sorting sections 510, 1510, and 2510. Again any number of these sections can be provided and three are used for illustration.

Figure 4:
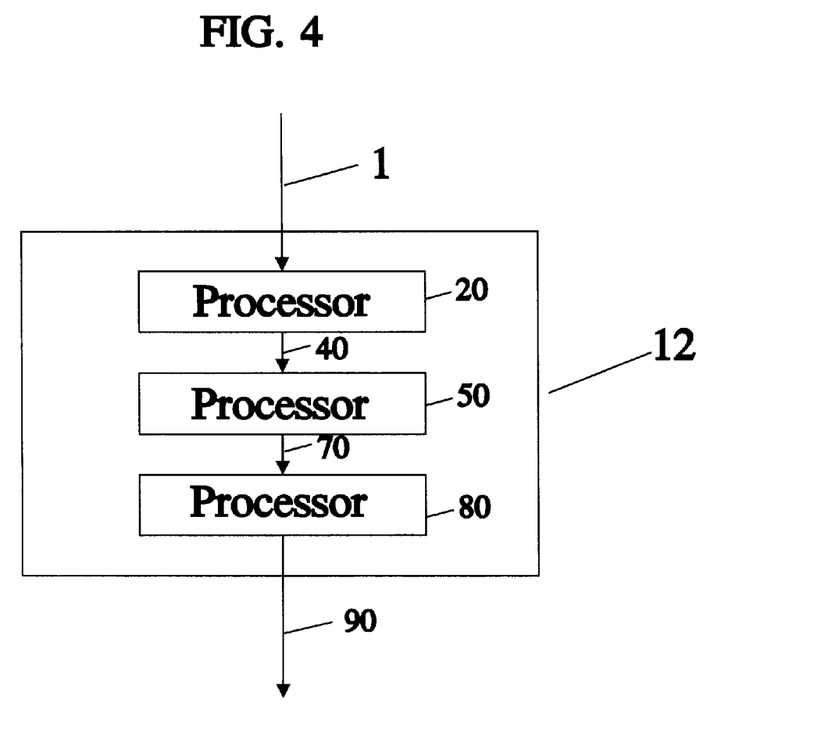
FIG. 4 shows an first blinding section.

FIG. 4 shows a first blinding section 12. The first blinding section 12 includes processors 20, 50, and 80. There could be any number of processors similar to processors 20, 50, and 80. The processors 20, 50, and 80 and other processors can also be referred to as servers. The input of processor 20 is vector 1 and the output of processor 20 and input of processor 50 is vector 40. The output of processor 50 is vector 70 and the input of processor 80 is vector 90.

Figure 5:
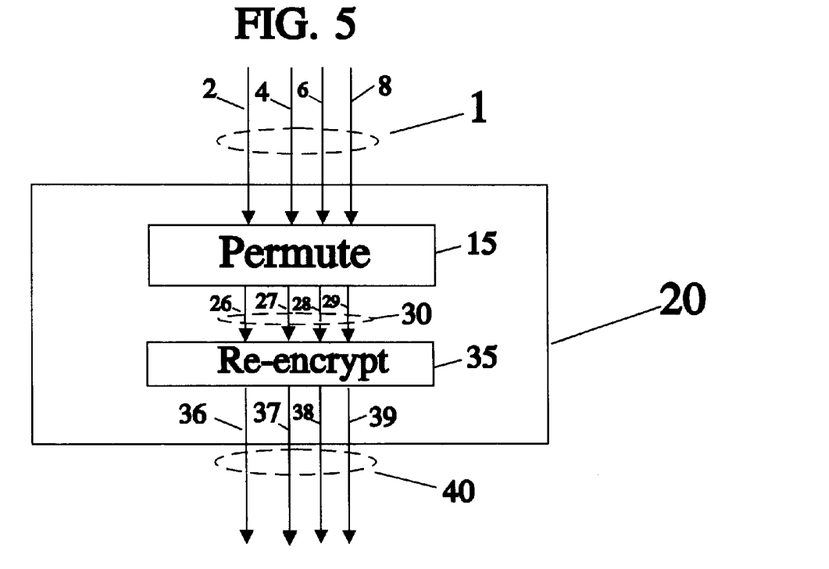
FIG. 5 shows the inputs and outputs to a processor of the initial blinding section in FIG. 4.

FIG. 5 shows the processor 20 of first blinding section 12 in more detail. The processor 20 is comprised of permutation section 15 and reencryption section 35. Vector 1 is comprised of data lines 2, 4, 6, and 8. The vector 1 is preferably a vector which could be comprised of any number of data lines or data bits. The vector 1 is connected and applied to the input of the permutation section 15 of processor 20. The permutation section 15 has an output 30 which is comprised of data lines 26, 27, 28, and 29. The permutation section 15 preferably outputs data in a random order which may or may not be a different order from the order that the data was received. For example, the data values "3", "7", "7", "4" may be received on input data lines 2, 4, 6, and 8 respectively, and the permutation section 15 may output those bits as "7", "7", "3", and "4" respectively on data output lines 26, 27, 28, and 29. Preferably, this reordering is random, so that one set of inputs on data lines 2, 4, 6, and 8 may be reordered one way and another set of inputs on data lines 2, 4, 6, and 8 may be reordered another way. These operations and others of embodiments of the present invention may be done in a computer or any other type of processor.

Processor 20 is also comprised of a reencryption section 35. The output from the permutation section 15 is applied to the reencryption section 35. The vector 30, comprised of data lines 26, 27, 28, and 29 is the output of the permutation section 15 and the input to the reencryption section 35. The reencryption section 35, takes data from its inputs and provides an encrypted output. So for example, if the data on data lines 26, 27, 28, and 29 are "7", "7", "3", "4", respectively, the reencryption section 35 might output "5", "3", "2", "5", at its output lines 36, 37, 38, and 39 which comprise the output vector 40. (Note that if the same value appears more than once in the input, the corresponding re-encryptions of these values may be different looking. Likewise, two encryptions of the same message may be different looking. When correctly decrypted, the correct results would still be obtained.) Alternatively, the reencryption section 35 preferably raises each element of a vector input to a secret exponent $a_i$, modulo p. I.e. if the element of the vector is "b" on data line 26 for example the element "b" would be changed to "$b^c$ modulo p", where "c"=$a_i$ is the secret key of user "i" or processor "i". The secret key may be used for decryption, or as in this case, re-encryption or blinding. Several keys can be used at once by each server (where a server may exercise the functions of several processors shown, for example a server may exercise the functions of processors 20, 205, 405, and 705). Some of the keys may have public keys and others do not. Where i is the number of the processor, i=1 for processor 20, i=2 for processor 50, and i=3 for processor 80. Thus the inputs on data lines 26, 27, 28, and 29 would each be raised to the secret exponent $a_i$, modulo p, and the results would be output on output lines 36, 37, 38, and 39.

"Modulo p" means that the element of vector "b" is divided by "p" and the remainder of this operation is the output. Therefore, if the element of vector "b" is "5", c=$a_i$=3, p=11, then we output "$b^c$ modulo p"="$5^3$ modulo 11"="125 modulo 11"="4". There are specific ways of choosing p, relating to the manner of encryption as will be appreciated by a person skilled in the art.

Processors 50 and 80 preferably are each comprised of permutation sections like permutation section 15 except that an independently and randomly chosen permutation is done, and reencryption sections like reencryption section 35 except that an independently and randomly chosen reencryption is done.

Figure 6:
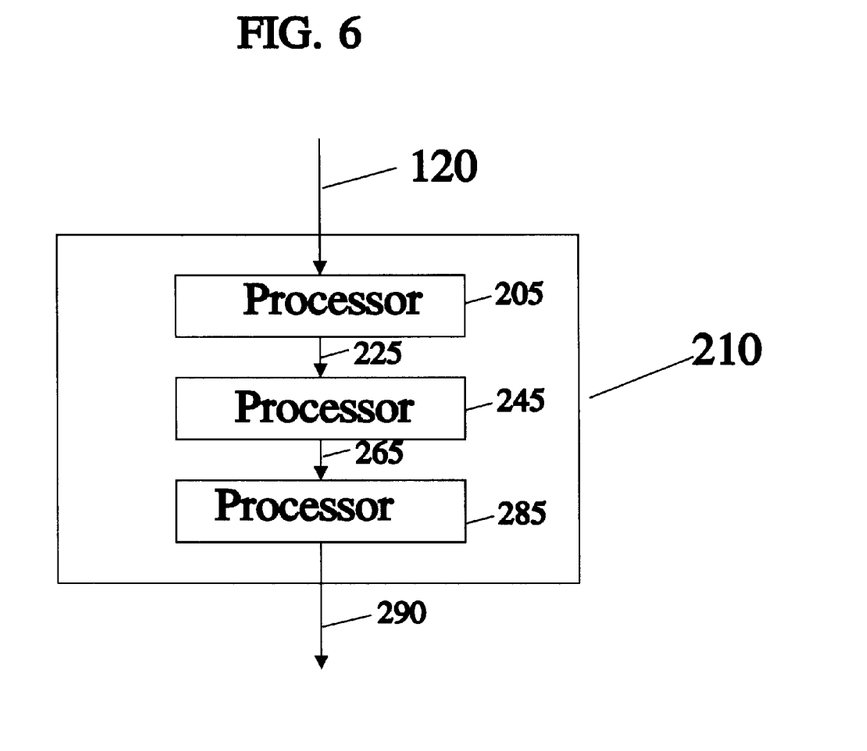
FIG. 6 shows a second blinding section.

FIG. 6 shows a diagram of blinding section 210 of the second blinding layer 200. Blinding section 210 includes processors 205, 245, and 285. Blinding section 210 has an input vector 120 and an output vector 290. Input vector 120 is applied to the input of processor 205 which outputs vector 225. Vector 225 is input to processor 245 which outputs vector 265. Vector 265 is input to processor 285 which outputs vector 290. The blinding section or module 210 can include any number of processors, like processors 205, 245, and 285, and three are shown only as an example. However, a fixed number of processors such as processor 205, 245, and 285 are preferably set by a protocol designer or a computer programmer before processing operations. Vectors 120, 225, 265, and 290 all contain four data lines as in FIG. 5, however there can be as many data lines as necessary.

Figure 7:
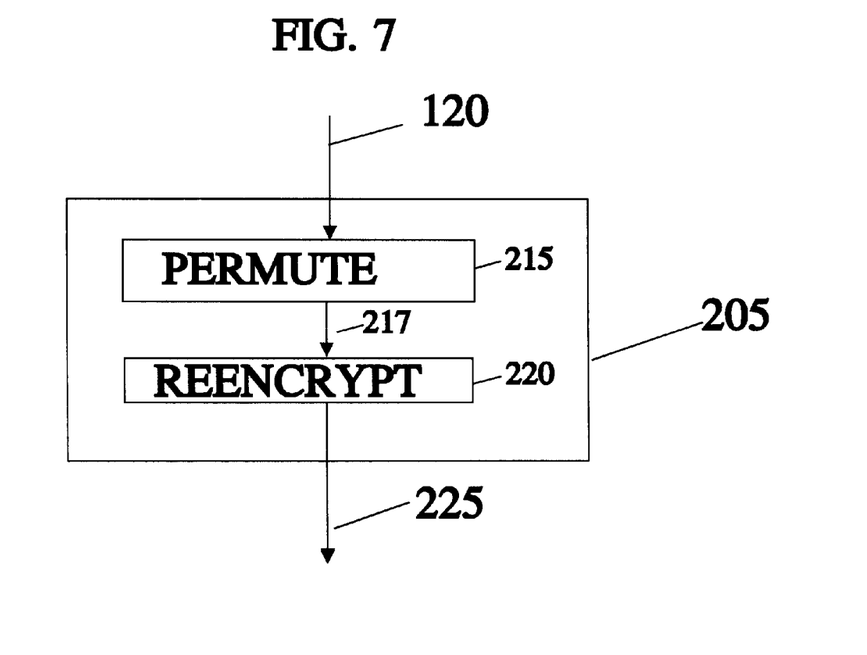
FIG. 7 shows a processor of the second blinding section.

FIG. 7 shows a diagram of processor 205. Processor 205 includes permutation section 215 and reencryption section 220. Input vector 120 is input to permutation section 215, permuted and output as output vector 217. Vector 217 is input to reencryption section 220, where it is re-encrypted as previously described and output as vector 225. Processors 245 and 285 function similarly to processor 205 and each has a permutation section and a reencryption section. Each processor 205, 245, and 285 preferably employs the same algorithms for permutation and re-encryption in the preferred implementation of the present invention. The permutation is random, with each processor, such as processor 205, 245, and 285, choosing a new and independent random permutation for each time, unless specifically specified to use the same permutation several times. (This is true for permutation section 15 as well). The reencryption is preferably done according to the same algorithm for each processor, such as 205, 245, and 285, but with independently and randomly chosen keys for reencryption.

The permutation sections such as permutation section 215 preferably function similar to permutation section 15 of FIG. 5 as previously described. The reencryption section 220 may raise each input to a power similar to "$a_i$ modulo p" previously discussed in reference to re-encryption section 80 of the processor 20 in FIG. 5.

Figure 8:
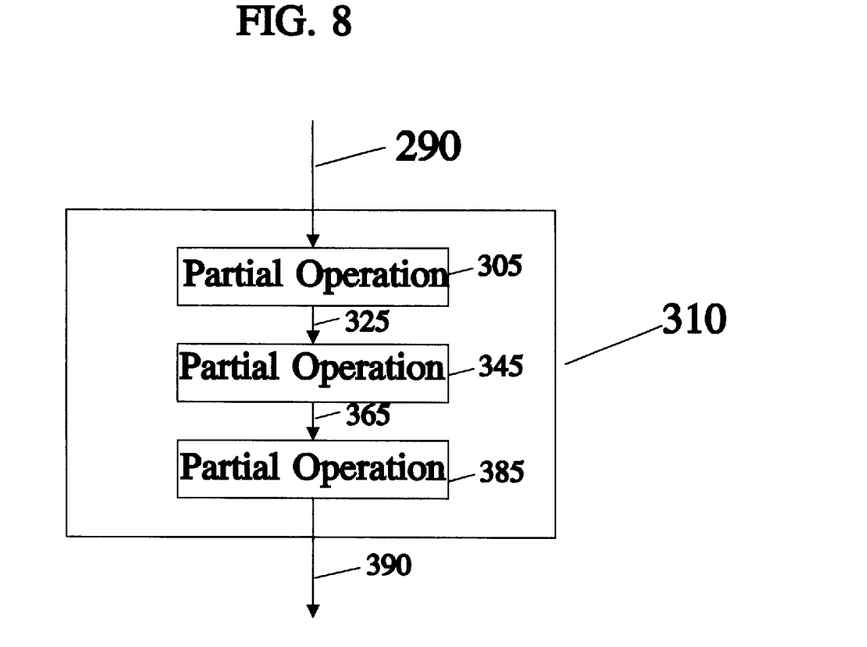
FIG. 8 shows an operation section.

The operation sections or modules, 310, 1310, and 2310 preferably perform an operation, which is preferably decryption. The operation can also be re-encryption, encryption, permutation, or blinding or another related operation as will be appreciated by a person skilled in the art. The processors in the operation modules such as for example operation module 310, may prove partial correctness of the output vector 390. If any proof fails then this processor is declared a cheater, and is excluded, as decribed below, after which the protocol proceeds as also decribed below. A proof of partial correctness in my preferred embodiment is a proof that the product of all the input vectors in FIG. 8, i.e. vectors 290, 325, and 365 correspond to the product of the output vectors in FIG. 8, i.e. vectors 325, 365, and 390 in the way that is intended. Here what is intended corresponds to what the operation is and may relate to a public key associated with the operation to be performed. There is a variety of available proofs that can be employed as will be appreciated by a person skilled in the art.

Figure 9:
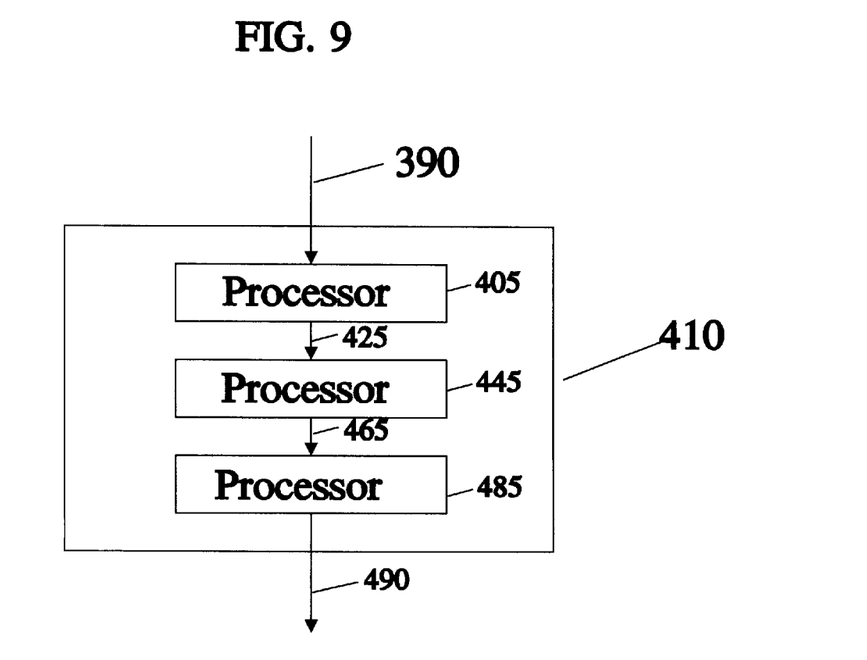
FIG. 9 shows a second unblinding section.
Figure 10:
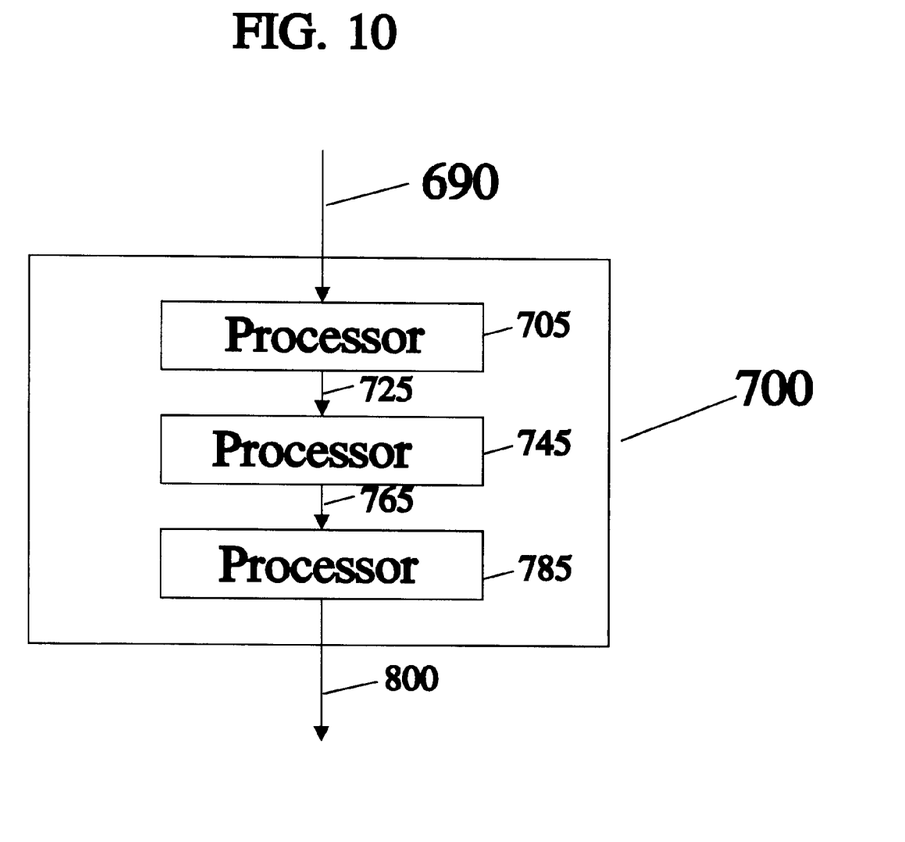
FIG. 10 shows a first unblinding section.

The second unblinding layer 400 preferably decrypts the encryption caused by second blinding layer 200. However the second unblinding layer 400 does not in this embodiment use permutation (although it could in another embodiment). The Sorting layer 500 preferably puts elements of each vector in an order so that they can be compared with one another as will be appreciated by one skilled in the art. The sorting sections 510, 1510, and 2510 take vector inputs 490, 1490, and 2490 and put the inputs in an order where they can be compared. The comparison section 600 compares the vectors 590, 1590, and 2590 to see if they are substantially the same, preferably identical. If they are, one of the three vectors (since they are the same it doesn't matter which) is output as vector 690 and sent to the first unblinding section 700, which decrypts the encryption provided by first blinding section 12. The unblinding section 700 is only used if all the vectors 590, 1590, and 2590 are substantially the same, preferably identical.

All the input and output vectors such as vectors, 1, 90, 120, 140, 160, 290, 1290, 2290, 390, 1390, 2390, 490, 1490, 2490, 590, 1590, 2590 are saved by the respective processors. If the vectors 590, 1590, and 2590 are not all identical then the following is performed: all processors reveal all secret permutations and re-encryption keys used in second blinding layer 200 and each processor proves that the correct operation was performed in its operation module in operation layer 300, and that the correct unblinding was done in its unblinding section in second unblinding layer 400. There is a wide variety of available proofs to be employed for this as will be appreciated by a person skilled in the art.

Here is an example of such a proof. If the inputs to a section, such as permutation section 15 are $x_1, x_2, x_3,$ and $x_4$ on the data lines 2, 4, 6, and 8 respectively, and the outputs from permutation section 15 on output lines 26, 27, 28, and 29, are $y_1, y_2, y_3,$ and $y_4$ respectively then for a partial proof of correctness the quantity $Xprod=x_1{}^*x_2{}^*x_3{}^*x_4$ modulo p; and the quantity $Yprod=y_1{}^*y_2{}^*y_3{}^*y_4$ are first computed. Then it is determined whether $Yprod=function(Xprod)$ by a method known to a person skilled in the art. This allows us to prove some property of the output $y_1, y_2, y_3,$ and $y_4$ with respect to the input $x_1, x_2, x_3,$ and $x_4$ without revealing what permutation was used.

Similarly, the product P1 of all elements of input vectors such as vectors 120, 290, 390, and 490 can be determined and compared to the product P2 of all elements of output vectors such as vectors 290, 390, 490, and 590 in order to perform an at least partial proof of correctness.

If any processor is found to not have acted correctly then this processor is a cheater. All cheating processors are excluded, and replaced by other processors after which we start with the same input vector 1 as before and all processors pick their random permutations and keys onwards in an independent manner from before.

The order of the permutation section 15 and reencryption section 35, or the order of any other permutation and reencryption operations could be reversed so that data is reencrypted first and permuted second or vice versa.

Each processor, such as processor 205, 245, and 285 may preferably be computers which are physically located in separate geographic locations and/or run different operating systems. However, some processors may be combined in a single server, such as processors 20, 205, 305, 405, and 705. But preferably there is a correspondence i.e. if one processor performs a particular blinding, or encryption, it is preferred that the same processor perform the corresponding unblinding, if desired to do so in the protocol. For example, processors 20 and 705 may be the same, so that a first blinding operation in first blinding section 12 is done and undone by the same processor.

This mix network scheme is particularly useful for encrypting the results of elections providing that a majority of all processors are honest. Also, proactive methods for sharing the secret used in the operation can be applied, as understood by anyone skilled in the art.

In operation of the embodiment of FIG. 3 the following occurs. An input vector 1 (which is preferably an encrypted input vector) which is comprised of multiple data lines 2, 4, 6, and 8 is input to the first blinding section 12 and simultaneously to its permutation section 15 shown in FIG. 5. The input vector 1 is randomly permuted and an output vector is produced at data lines 26, 27, 28, and 29 of output vector 30. The vector 30 is input to re-encryption section 35, where it is encrypted and the result is output as vector 40 comprised of data lines 36, 37, 38, and 39. Vector 40 is then input to processor 50 where it is permuted and re-encrypted in a manner similar to that shown in FIG. 5. The resulting vector 70 is then input to processor 80 where it too is permuted and re-encrypted in a manner similar to that shown in FIG. 5.

The resulting vector 90 is then input to duplicator 100, where it is duplicated into first, second, and third duplicated vectors 120, 140, and 160. Any number of further duplicated vectors can be provided. All three duplicated vectors are subject to similar operations with the exception of the particular mathematical factors used. The first duplicated vector 120 will be referred to for illustration.

Duplicated vector 120 is input to the blinding section 210 of the second blinding layer 200. As shown in FIGS. 6 and 7, the first duplicated vector 120 is input to the processor 205. The first duplicated vector 120 is permuted and re-encrypted by permutation section 215 and re-encryption section 220 respectively. A resulting vector 225 is produced which is input to processor 245, where permutation and re-encryption similar to that shown in FIG. 7 is done. A resulting vector 265 is produced which is input to processor 285, where permutation and re-encryption similar to that shown in FIG. 7 is again done.

A resulting vector 290 from the blinding section 210 of the second blinding layer 200 is produced. Likewise a resulting vector 1290 and 2290 for the blinding sections 1210 and 2210 is produced for the second and third duplicated vectors.

Concerning the first duplicated vector its resulting vector 290 is then applied to the operation module 310. The operation module 310, shown in FIG. 8, subjects vector 290 to three sequential operations in processors 305, 345, and 385, each of which contains a partial operation device. Preferably partial decryption is performed. Preferably a vector 390 is produced which is a fully decrypted vector, at least as to the encryption that was present regarding vector 1. (The encryption introduced by first blinding section 12 and second blinding section 210 is still present). Similarly concerning the second and third duplicated vectors, vectors 1390, and 2390 are preferably produced which are fully decrypted duplicated vectors.

The vector 390 is then applied to unblinding section 410 which removes the "extra" encryption put in by blinding section 210. The purpose of this extra encryption along with the permutations employed is to implement robustness by making any attack or error noticed. Thus, if some processors should not perform the expected operations in blinding layer 200, operation layer 300, and unblinding layer 400, this will be noticed. If blinding layer 200 and unblinding layer 400 were not used then it may under some circumstances be possible for a cheating processor to perform an operation different from operation 300, resulting in an incorrect output, without this being noticed.

Likewise the vectors 1390 and 2390 are applied to unblinding sections 1410 and 2410 to remove the "extra" encryption put in by blinding sections 1210 and 2210.

These unblindings may all be done in parallel. To produce a result as if produced by a parallel compute, the final outputs of the unblinding operations that are performed first may be committed to and later presented in full, once all unblinding modules have finished their unblinding tasks. This can be done using a variety of methods, as a person skilled in the art will appreciate. This is done in our preferred implementation.

The vector 490 is then output to sorting section 510 where it is sorted so that is can be compared to the vectors 1490 and 2490 from the second and third duplicated branches, which are sorted by sorting sections 1510 and 2510 respectively.

Finally, the comparison section 600 compares the vectors 590, 1590 and 2590 to determine if they are substantially the same, preferably identical. If they are, one of them is output as vector 690 (doesn't matter which) as an input to unblinding section 700. Unblinding section 700 decrypts the "extra" encryption provided by first blinding section 12. This was needed so that if it was found that some processors cheated, no output will be produced (as only an encryption of this will be available). This is important in order to hide partial results from cheating processors because we only want to produce an output if it will be correct. Example: if the first out of three votes are correctly decrypted and the second and third are replaced by phony votes, then outputting such incorrect result would reveal the first vote.

I claim:

1. An apparatus comprising:
   a duplicator for duplicating a first vector of encrypted inputs;
   a first operation module comprised of a first and a second processor, the first and second processors of the first operation module each comprised of a partial operation device;
   a second operation module comprised of a first and a second processor, the first and second processors of the second operation module each comprised of a partial operation device;
   wherein the duplicator duplicates the first vector of encrypted inputs to provide first and second duplicated vectors,
   wherein the first duplicated vector is supplied to and operated on by the first operation module by supplying the first duplicated vector to the first processor of the first operation module whose partial operation device partially operates on the first duplicated vector, and then by supplying the partially operated on first duplicated vector to the second processor of the first operation module whose partial operation device partially operates on the already partially operated on first duplicated vector to form a fully operated on first duplicated vector;
   wherein the second duplicated vector is supplied to and operated on by the second operation module by supplying the second duplicated vector to the first processor of the second operation module whose partial operation device partially operates on the first duplicated vector, and then by supplying the partially operated on first duplicated vector to the second processor of the second operation module whose partial operation device partially operates on the already partially operated on second duplicated vector to form a fully operated on second duplicated vector;
   wherein the apparatus is further comprised of a means for comparing which compares the fully operated on first duplicated vector with the fully operated on second duplicated vector;
   and wherein the first vector, the first and second duplicated vectors, the partially operated on first and second duplicated vectors, and the fully operated on first and second duplicated vectors each are comprised of one or more data values on one or more data lines.

2. The apparatus of claim 1 and further comprising:
   a plurality of further operation modules each comprised of a plurality of further processors, the plurality of further processors each comprised of a partial operation device;
   wherein the duplicator duplicates the vector of encrypted inputs to provide a plurality of further substantially similar duplicated vectors to the plurality of further operation modules;

wherein each of the plurality of further duplicated vectors is supplied to and operated on by one of the plurality of further operation modules;

wherein each of the plurality of further duplicated vectors is supplied to and operated on by one of the plurality of further operation modules by supplying each of the plurality of further duplicated vectors to a chain of the plurality of processors and their corresponding partial operation devices within a respective operation module, to form a plurality of further fully operated on duplicated vectors;

the means for comparing compares the plurality of further fully operated on duplicated vectors with one another and wherein the plurality of further substantially similar duplicated vectors, and the plurality of further fully operated on duplicated vectors are each comprised of one or more data values on one or more data lines.

3. The apparatus of claim 1 wherein:

the first and second operation modules are decryption modules; and the partial operation devices are partial decryption devices.

4. The apparatus of claim 2 wherein:

the first, second, and plurality of further operation modules are decryption modules; and the partial operation devices are partial decryption devices.

5. The apparatus of claim 1 wherein:

the first and second operation modules are encryption modules; and the partial operation devices are partial encryption devices.

6. The apparatus of claim 2 wherein:

the first, second, and plurality of further operation modules are encryption modules; and the partial operation devices are partial encryption devices.

7. The apparatus of claim 1 wherein:

the first and second operation modules are re-encryption modules; and the partial operation devices are partial re-encryption devices.

8. The apparatus of claim 2 wherein:

the first, second, and plurality of further operation modules are re-encryption modules; and the partial operation devices are partial re-encryption devices.

9. The apparatus of claim 1 wherein:

the first and second operation modules are permutation modules; and the partial operation devices are permutation devices.

10. The apparatus of claim 2 wherein:

the first, second, and plurality of further operation modules are permutation modules; and the partial operation devices are partial permutation devices.

11. The apparatus of claim 1 further comprising:

a first blinding layer comprised of a first blinding section which receives a pre-first encrypted vector of inputs, performs a blinding operation on the pre-first vector of inputs and outputs the first vector of encrypted inputs to the duplicator;

and wherein the pre-first encrypted vector of inputs is comprised of one or more data values on one or more data lines.

12. The apparatus of claim 11 wherein:

the first blinding section of the first blinding layer permutes and re-encrypts the pre-first encrypted vector of inputs.

13. The apparatus of claim 11 further comprising:

a first unblinding layer comprised of a first unblinding section which performs an unblinding operation on the fully operated on first and second duplicated vectors.

14. The apparatus of claim 13 and wherein:

the first unblinding section of the first unblinding layer performs the unblinding operation only if the means for comparing has determined that the first and second fully operated on duplicated vectors are the same.

15. The apparatus of claim 11 further comprising:

a second blinding layer comprised of first and second blinding sections;

wherein the first duplicated vector is supplied to the first blinding section of the second blinding layer;

the second duplicated vector is supplied to the second blinding section of the second blinding layer;

and the first and second blinding sections of the second blinding layer each perform a blinding operation on the first and second duplicated vectors respectively and then output the result to the first and second operation modules, respectively, and wherein supplying the first and second duplicated vectors to the first and second operation modules, respectively is defined as supplying first and second duplicated vectors which have been first blinded by the first and second blinding sections of the second blinding layer, respectively, to the first and second operation modules.

16. The apparatus of claim 15 further comprising:

a second unblinding layer comprised of first and second unblinding sections;

wherein the first and second unblinding sections perform unblinding operations on the fully operated on first and second duplicated vectors, respectively.

17. The apparatus of claim 1 wherein:

the means for comparing includes first and second sorting sections which sort the first and second fully operated on duplicated vectors respectively, so that they can be compared.

* * * * *